P. VON FRANTZIUS

Sept. 23, 1930. PISTOL Re. 17,813

Original Filed Sept. 13, 1928

Inventor:
Peter Von Frantzius
By Fred Gerlach
his Atty.

Reissued Sept. 23, 1930 Re. 17,813

UNITED STATES PATENT OFFICE

PETER VON FRANTZIUS, OF CHICAGO, ILLINOIS

PISTOL

Original No. 1,760,674, dated May 27, 1930, Serial No. 305,730, filed September 13, 1928. Application for reissue filed July 12, 1930. Serial No. 467,592.

The invention relates generally to pistols. More particularly the invention relates to that type of pistol which is in the form of a fountain pen and operates to discharge an incapacitating fluid, such as tear gas.

One object of the invention is to provide a pistol of this type which is generally of new and improved construction, may be manufactured at a comparatively low cost and is exceedingly efficient in operation.

Another object of the invention is to provide a gas discharging pistol in which provision is made for preventing the pistol from being used for firing cartridges containing bullets or projectiles.

Other objects of the invention and the various advantages and characteristics of the present pistol construction will be apparent from a consideration of the following detailed description.

The invention consists in the several novel features hereinafter set forth and more particularly defined by the claims at the conclusion hereof.

Figure 1:
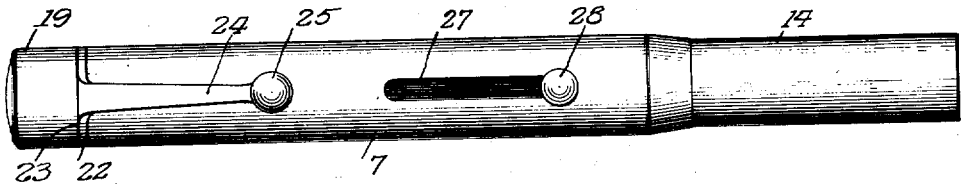
Figure 2:
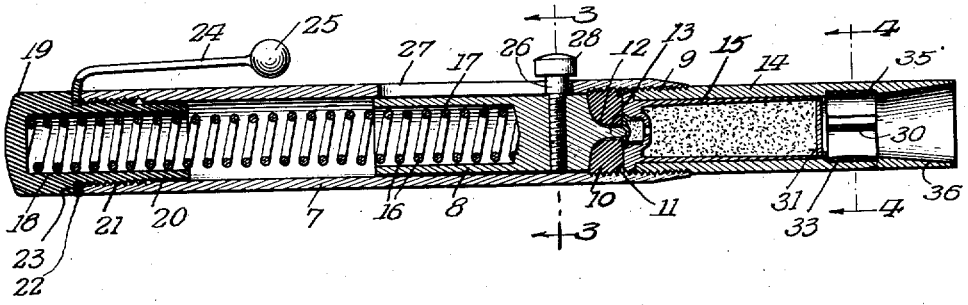
Figure 3:
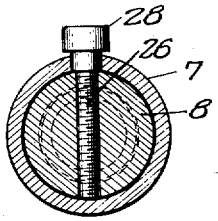
Figure 4:
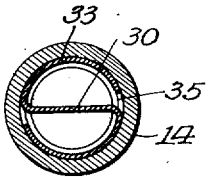
Figure 5:
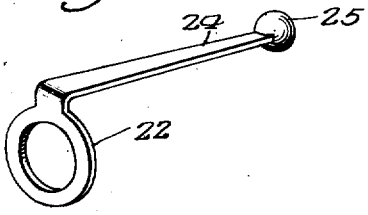

In the drawing which accompanies and forms a part of this specification or disclosure and in which like numerals of reference denote corresponding parts throughout the several views: Fig. 1 is a side elevation of a pistol embodying the invention. Fig. 2 is a longitudinal section. Fig. 3 is a transverse section taken on line 3—3 of Fig. 2. Fig. 4 is a transverse section taken on line 4—4 of Fig. 2. Fig. 5 is a perspective of the clip for holding the pistol in a pocket.

The invention is exemplified in a pistol comprising a cylindrical stock 7 in which is slidably mounted a plunger 8. The outer end of this stock is provided with an internal screw-thread 9 to which a breech block 10 is screw-threaded. Said block is preferably retained in a position inwardly of the outer end of the stock, and has recesses 11 therein to receive a key whereby it may be turned into and out of its operative position in the stock. In addition to the recesses, the block has a central opening 12 through which a firing pin 13 on plunger 8 is adapted to pass. A barrel 14 has its inner end externally threaded to fit the screw-thread 9 on the stock 7, and is adapted to receive a cartridge 15 containing material which, when fired, will produce and discharge an incapacitating fluid, such as tear gas. The inner end of the barrel engages the rim of the cartridge, and is adapted to be screwed into position to hold securely the cartridge against the breech block. To load the pistol, the barrel 14 is first removed from the stock and the cartridge is inserted into the barrel. The barrel, with the cartridge therein, is then screwed into the stock until the rim of the cartridge is confined between the barrel and the breech block. The plunger 8 is elongated so it will slide freely in the stock 7, and is operated to fire the cartridge by a coil spring 16, one end of which is held against lateral displacement in a socket 17 in said plunger and the other end of which is held in a socket 18 in a cap 19. The cap has a substantially cylindrical portion or stem 20 which extends into the stock 7 and is provided with an external thread 21 to fit an internal thread on the inner end of stock 7 to secure removably the cap in place. An advantage of utilizing a removable cap at the rear or inner end of the stock is that the spring may be readily removed for replacement or repair purposes. An additional advantage resides in the fact that access to the breech block may be had through the rear end of the stock after removal of the plunger and spring. The outer peripheries of the cap and stock are flush. A clip for holding the pistol in a vest pocket comprises a ring 22 which is clamped between a shoulder 23 on the cap 18 and the inner end of stock 7, and a resilient arm 24 which is provided at its outer end with a ball 25 to grip a portion of the pocket. To remove the spring 16 or the clip, it is only necessary to unscrew the cap 18 from the stock 7. By clamping the ring of the clip in this manner, it may be rotatively shifted to bring the arm 24 into any desired position. A stud 26 is screw-threaded to the firing plunger 8 and extends through a longitudinally extending straight slot 27 in the stock. This slot permits the plunger and firing pin to be retracted against the force of spring 16. The stud has a head 28 so it can be readily engaged by a finger in retracting the plunger.

To fire the cartridge, the user will pull the head 28 of the stud backwardly to retract the plunger against the force of spring 16, and then replace the plunger. Upon release of the plunger, the spring will impel the plunger outwardly with sufficient force to cause the firing pin 13 to fire the cartridge.

In a pistol for discharging cartridges for producing incapacitating gas, it is desirable to provide means to prevent the pistol from being loaded with a cartridge having a bullet therein. For this purpose, a blade 30 of thin metal is confined in and extends diametrically across the barrel adjacent to the outer end of the shell of the cartridge. The material for producing gas is confined in the shell of the cartridge by a wad 31, and the blade 30 is thin or has a sharp edge to server the wad as it is projected from the shell of the cartridge, so it will be discharged from the barrel when the cartridge is fired. The blade 30 is provided with reversely extending arcuate portions 33 which fit in an annular groove 35 in the barrel. The blade and arcuate portions are formed of resilient metal so said portions can be sprung into the groove in placing the blade into the barrel. This exemplifies means for preventing the insertion of a cartridge with a bullet, and for cutting the wad of the tear gas cartridge when it is fired.

The bore of the barrel is flared outwardly, as at 36, so as to cause the gas to spread in a flared column. In practice, it has been found that by spreading the column of gas, it is more effective in reaching its intended mark than when it is projected from a truly cylindrical barrel.

The gas discharging pistol herein disclosed may be manufactured at a comparatively low cost by virtue of the fact that it consists of but a small number of parts. In view of the fact that the blade 30 is located so as to prevent the use of cartridges having bullets or projectiles, the pistol may be used without danger of inflicting permanent injury.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fountain pen shaped pistol of the character described, the combination of an elongated tubular stock embodying an internal screw-thread at one end thereof, a cap adapted to close the said one end of the stock and provided with a substantially cylindrical part extending into the stock, said part having formed therein an open-ended socket and embodying an external screw-thread for engaging the aforementioned internal thread and connecting the cap removably in place, a barrel for a cartridge secured removably to the other end of the stock, a plunger slidably mounted in the stock and provided with a firing pin, and a spring extending between the plunger and the cap, said spring having one end thereof disposed in the socket and being removable through the said one end of the stock when the cap is disconnected from the internal screw thread.

2. In a pistol, the combination of an elongated tubular stock, a spring-pressed firing plunger slidably mounted in the stock, a barrel for a cartridge secured removably to one end of the stock, and a wad-cutting blade extending across the bore of the barrel and disposed so that it is in close proximity to the outer end of the cartridge shell and operates to prevent the insertion into the barrel of a cartridge with a bullet.

3. In a pistol, the combination of a cylindrical stock, a spring-pressed firing element in the stock, a breech block in the stock, a barrel for a cartridge, and a wad-cutter in the barrel disposed adjacent the outer end of the cartridge shell to prevent insertion of a cartridge with a bullet.

4. In a pistol, the combination of a cylindrical stock, a spring-pressed firing element in the stock, a breech block in the stock, a barrel for a cartridge, provided with a groove, and a blade having a resilient strip held in said groove.

5. In a pistol, the combination of a cylindrical stock, a spring-pressed firing element in the stock, a breech block in the stock, a barrel for a cartridge, provided with a groove, and a blade having a member extending across the barrel and resilient members confined in said groove.

6. In a pistol for discharge incapacitating gas, the combination of an elongated tubular stock, a barrel for a gas cartridge having one end thereof secured removably to one end of the stock, a spring-pressed plunger mounted slidably in the barrel and provided with a firing pin for the gas cartridge, and a member extending across the bore of the barrel and positioned in close proximity to the outer end of the shell of the gas cartridge for preventing the firing or insertion of a cartridge with a bullet in the barrel.

7. In a fountain pen shaped pistol of the character described, the combination of an elongated tubular stock, a barrel for a cartridge secured removably to one end of the stock, a plunger slidably mounted in the stock and provided with a firing pin for the cartridge, a spring for actuating the plunger disposed in the stock and removable for repair or replacement purposes through the other end of the stock, a stud for retracting the plunger projecting laterally from said plunger and extending through a longitudinal slot in the stock, and a cap for closing completely the said other end of the stock connected by quickly detachable means to the stock and provided with means extending into the stock for engaging one end of the spring and holding the same against lateral displacement.

8. In a fountain pen shaped pistol of the character described, the combination of an elongated tubular stock embodying a screw-thread at one end thereof and having formed therein a longitudinally extending slot, a barrel for a cartridge secured removably to the other end of the stock, a plunger slidably mounted in the stock and provided with a firing pin for the cartridge, a spring for actuating the plunger disposed in the stock and removable for replacement or repair purposes through the said one end of the stock, a stud for retracting the plunger secured directly to and projecting laterally from said plunger and extending through the slot in the stock, and a cap for closing completely said one end of the stock having formed thereon a screw-thread for engaging the screw-thread on the stock and connecting the cap removably in place, and provided with means extending into the stock for engaging one end of the spring and holding the same against lateral displacement.

9. In a fountain pen shaped pistol of the character described, the combination of an elongated tubular stock having an internal screw-thread at one end thereof, a barrel for a cartridge secured removably to the other end of the stock, a plunger slidably mounted in the stock and provided with a firing pin for the cartridge, a spring for actuating the plunger disposed in the stock and removable for replacement or repair purposes through the said one end of the stock, a stud for retracting the plunger projecting laterally from said plunger and extending through a longitudinal slot in the stock, and a cap for closing said one end of the stock embodying an imperforate cross wall and a substantially cylindrical part attached to one face of the cross wall extending into the stock, said part having formed thereon an external screw-thread for engaging the aforementioned internal screw-thread and connecting the cap removably in place, and being provided with means forming an abutment for one end of the spring.

10. In a fountain pen shaped pistol of the character described, the combination of an elongated tubular stock having an internal screw-thread at one end thereof, a barrel for a cartridge secured removably to the other end of the stock, a plunger slidably mounted in the stock and provided with a firing pin for the cartridge, a spring for actuating the plunger disposed in the stock and removable for replacement or repair purposes through the said one end of the stock, a stud for retracting the plunger projecting laterally from said plunger and extending through a longitudinal slot in the stock, and a cap for closing said one end of the stock embodying a circular cross wall and a substantially cylindrical part of smaller diameter attached to one face of the cross wall and extending into the stock, said part having formed thereon an extended screw-thread for engaging the aforementioned internal screw-thread and connecting the cap removably in place and being provided with means for engaging one end of the spring and holding the same against lateral displacement in the stock.

11. In a fountain pen shaped pistol of the character described, the combination of an elongated tubular stock having an internal screw-thread at one end thereof, a barrel for a cartridge secured removably to the other end of the stock, a plunger slidably mounted in the stock and provided with a firing pin for the cartridge, a spring for actuating the plunger disposed in the stock and removable for replacement or repair purposes through the said one end of the stock, a stud for retracting the plunger projecting laterally from said plunger and extending through a longitudinal slot in the stock, and a one-piece cap for closing said one end of the stock embodying a circular imperforate cross wall and a substantially cylindrical part of smaller diameter formed integrally with one face of the cross wall and extending into the stock, said part having formed thereon an external screw-thread for engaging the aforementioned internal screw-thread and connecting the cap removably in place and being provided with integral means for engaging one end of the spring and holding the same against lateral displacement in the stock.

12. In a fountain pen shaped pistol of the character described, the combination of an elongated tubular stock having an internal screw-thread at one end thereof, an externally threaded breech block disposed in said one end of the stock and connected removably to the internal screw-thread, a cartridge barrel having one end thereof connected removably to said internal screw-thread and disposed outwardly of the breech block, a one-piece plunger slidably mounted in the stock and provided with a firing pin for the cartridge, a spring in the other end of the stock for actuating the plunger, said plunger and spring being removable through the said other end of the stock, a stud for retracting the plunger connected removably to and projecting laterally from said plunger and extending through a longitudinal slot in the stock, and a cap for closing the said other end of the stock connected by quickly detachable means to the stock, said breech block being accessible through the said other end of the stock after removal from the stock of but the cap, spring and plunger.

13. In a fountain pen shaped pistol of the character described, the combination of an elongated tubular stock having internal screw-threads at the ends thereof, an externally threaded breech block connected removably to the internal screw-thread at one end of the stock, a cartridge barrel having one end thereof threaded and connected removably to the said one internal screw-thread outwardly of the breech block, and a one-piece plunger slidably mounted in the stock and provided with a firing pin for the cartridge a spring for actuating the plunger disposed in the other end of the stock, said plunger and spring being removable through the said other end of the stock, a stud for retracting the plunger connected removably to and projecting laterally from said plunger and extending through a longitudinal slot in the stock, and a cap for closing the said other end of the stock having formed thereon an external screw-thread for engaging the other internal screw-thread on the stock and connecting the cap removably in place, said breech block being accessible through the said other end of the stock after removal from the stock of but the cap, spring and plunger.

Signed at Chicago, Illinois, this 10th day of July, 1930.

PETER VON FRANTZIUS.